April 5, 1927.
H. T. AYRES
1,623,651
END CONNECTION AND SHOCK ABSORBER FOR VEHICLE SPRINGS
Filed Oct. 1, 1924
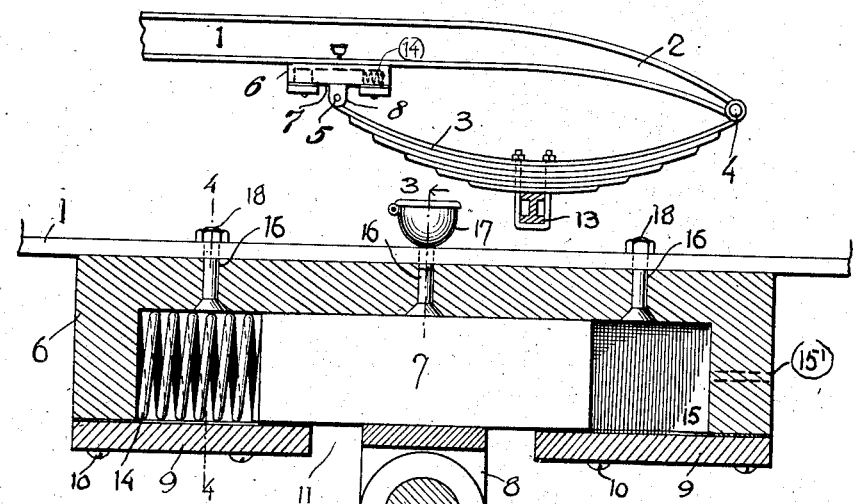
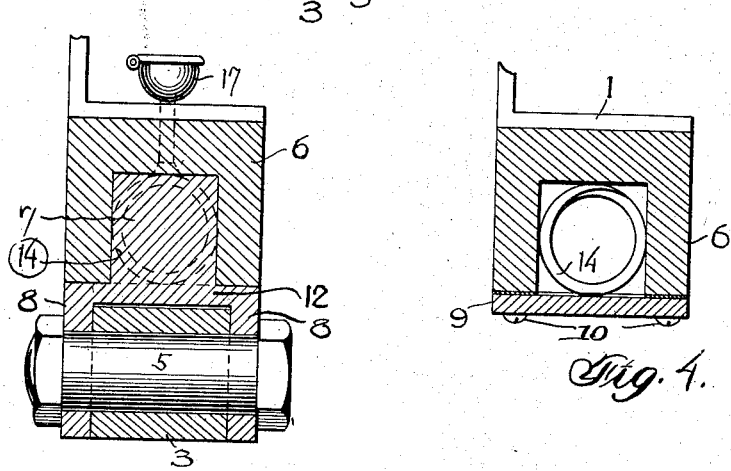
Inventor
Harry T. Ayres.
By E. W. Anderson
Attorney Patented Apr. 5, 1927.

1,623,651

UNITED STATES PATENT OFFICE.

HARRY T. AYRES, OF DURANGO, COLORADO.

END CONNECTION AND SHOCK ABSORBER FOR VEHICLE SPRINGS.

Application filed October 1, 1924. Serial No. 741,047.

The invention has relation to a spring hanger and shock absorber for automobiles, adapted for use in substitution for the ordinary spring shackle in use upon automobiles and motor trucks, and has for its object the provision of an improved device of this description.

The invention consists in the novel construction and combinations of parts, as hereinafter set forth.

In the accompanying drawings illustrating the invention, Figure 1 is a side view of the invention as applied; Figure 2 is a central ongitudinal section of the invention; Figure 3 is a section on the line 3—3, Figure 2, and Figure 4 is a section on the line 4—4, Figure 2.

In these drawings, the numeral 1 designates one of the longitudinal chassis frame side bars of an automobile or motor truck, of channel form in cross section and having at its forward free end a depending portion 2, to the terminal of which the vehicle spring 3 is connected at its forward end at 4, the other end of said front spring having a connection at 5 to the invention to be described.

This includes an elongated open bottom box 6, within which reciprocates a slide 7, provided with depending parallel spaced-apart-perforated ears 8, perforated for the connection 5 aforesaid.

The box 6 has at each end a short bottom plate 9, removably secured thereto by screws or bolts 10, and leaving the central part of the bottom of said box open as at 11, said ears 8 having a transverse connection 12 joined to said slide and projecting laterally thereof beneath the sides of said box.

The slide 7 is normally located centrally of the lower opening 11 of the box 6, said box having at the end thereof nearest the axle 13, a coiled spring 14. and at the opposite end thereof a clearance space 15. The ends of the box 6 and the sides thereof are closed and the end of the box wherein said clearance space is located may be provided with an air hole 15′ for escape of air.

The box 6 is provided at its top with three perforations 16 the central one of which is used as a feed for an oil cup 17, the stem of which projects upwardly through an aligned perforation of the lower flange of the frame side bar 1, to which said box is connected by bolts 18 engaging the end perforations 16, said oil cup being located within the channel of said bar, In the operation of the invention, the spring 3 yielding under pressure the slide 7 will be moved in a direction away from the axle 13, the clearance space at 11 and at 15 being sufficient to admit of the maximum yield of the spring without contact of the slide or its ears with the end of the box 6 or with the lower covers 9.

Upon the rebound of the spring 3 the slide 7 engages the coiled spring 14 which acts as a cushion and thus to thereby absorb the shock.

The invention is of simple and durable nature, readily applied and has been found in practice to well accomplish the results stated.

The invention is applicable similarly to the rear end of the rear vehicle spring.

I claim:—

1. An end connection and shock absorber of the character described, and comprising an open-bottom slide-block casing, removable bottom end plates secured thereto, providing end chambers, a central open space, a slide block mounted therein and having laterally extending and downwardly projecting spaced apart ears bearing against the bottom edges of said casing at said central space, the free end of the spring flexibly secured between said ears, a coiled spring within one of said end chambers interposed between said slide block and end of chamber, the opposite end of chamber having an opening to the atmosphere to admit freedom of movement of the slide block therein and permit movement of the free end of the vehicle spring.

2. An end connection and shock absorber for behicle springs, consisting of an inverted box-form casing, a slide block working therein, and provided with depending spaced apart ears, a coiled spring within said casing at one end thereof between the end and said block, said casing having a bottom cover at each end, and a central bottom opening wherein said block and ears are adapted to slide, the free end of the vehicle spring having flexible connection with said block between said ears, and said casing having at the opposite end a clearance chamber having an axial air vent in its outer end, whereby to admit of freedom of movement of the slide block and the end of the vehicle spring carried thereby.

In testimony whereof I affix my signature.

HARRY T. AYRES.